(12) United States Patent
Kamo

(10) Patent No.: US 7,423,813 B2
(45) Date of Patent: Sep. 9, 2008

(54) ZOOM LENS SYSTEM AND IMAGE PICKUP APPARATUS INCLUDING THE SAME

(75) Inventor: Yuji Kamo, Hino (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 11/784,104

(22) Filed: Apr. 4, 2007

(65) Prior Publication Data

US 2007/0242367 A1  Oct. 18, 2007

(30) Foreign Application Priority Data

Apr. 12, 2006  (JP) .............................. 2006-109395

(51) Int. Cl.
    G02B 15/14  (2006.01)
    G02B 9/34   (2006.01)
    G03B 17/00  (2006.01)

(52) U.S. Cl. ................... 359/686; 359/683; 359/773; 359/715; 396/72; 348/360

(58) Field of Classification Search ............... 359/554, 359/557, 683, 684, 686, 687, 690, 715, 747, 359/772, 773; 396/52–55, 72; 348/208, 348/360

See application file for complete search history.

(56) References Cited

U.S. PATENT DOCUMENTS

| 6,751,030 | B2 * | 6/2004 | Saruwatari ................... 359/687 |
| 6,934,091 | B2 * | 8/2005 | Takahashi et al. ........... 359/689 |
| 7,154,680 | B2 * | 12/2006 | Satori et al. ................. 359/687 |
| 7,158,315 | B2 * | 1/2007 | Shibayama ................. 359/690 |
| 7,177,091 | B2 * | 2/2007 | Iwasawa et al. ............. 359/680 |
| 7,187,504 | B2 * | 3/2007 | Horiuchi ..................... 359/683 |
| 7,221,518 | B2 * | 5/2007 | Kim et al. .................... 359/687 |
| 7,330,316 | B2 * | 2/2008 | Shibayama et al. ......... 359/686 |

FOREIGN PATENT DOCUMENTS

| JP | 04-053916 | 2/1992 |
| JP | 09-197272 | 7/1997 |

* cited by examiner

Primary Examiner—Loha Ben
(74) Attorney, Agent, or Firm—Kenyon & Kenyon LLP

(57) ABSTRACT

There is disclosed a zoom lens system comprising, in order from an object side: a first lens unit having a positive refractive power; a second lens unit having a negative refractive power; a third lens unit having a positive refractive power; and a fourth lens unit having a negative refractive power. During zooming from a wide-angle end to a telephoto end, a space between the first lens unit and the second lens unit enlarges, a space between the second lens unit and the third lens unit narrows, a space between the third lens unit and the fourth lens unit changes, and all of the first to fourth lens units move along an optical axis. The zoom lens system further comprises an aperture stop which moves integrally with the third lens unit during the zooming.

24 Claims, 8 Drawing Sheets

ZOOM LENS SYSTEM AND IMAGE PICKUP APPARATUS INCLUDING THE SAME

CROSS REFERENCE TO RELATED APPLICATIONS

This application claims benefit under 35 U.S.C. §119 of Japanese patent application of No. 2006-109395 filed on Apr. 12, 2006, the contents of which are incorporated herein by reference.

BACKGROUND OF THE INVENTION

1. Field of the Invention

The present invention relates to a zoom lens system and an electronic image pickup apparatus using the same.

2. Description of the Related Art

Heretofore, as a zoom lens system for photographing, a zoom lens system including, in order from an object side, a first lens unit having a positive refractive power, a second lens unit having a negative refractive power, a third lens unit having a positive refractive power and a fourth lens unit having a negative refractive power has been known.

In the zoom lens system having such a refractive power layout, the lens units (the first and third lens units) having the positive refractive power and the lens units (the second and fourth lens units) having the negative refractive power are alternately arranged: In this zoom lens system, the second and third lens units are main magnification change units, and an off-axial light flux is struck up by the negative power of the fourth lens unit. This constitution is advantageous in reducing a size of the zoom lens system relative to an image surface size. The zoom lens system has a lens unit arrangement in which two telephoto types are arranged, and this constitution is advantageous for reduction of the total length of the zoom lens system.

Moreover, in an image pickup apparatus such as a digital camera or a video camera, an electronic image sensor such as a CCD image sensor or a CMOS image sensor is used as an image pickup element. In the camera in which the electronic image sensor is used, it is preferable to emit a light flux from a photographing lens system so that the light flux is nearly vertical to an image pickup surface of the image sensor (reduce an angle of the light flux with respect to a normal of the image pickup surface). Therefore, an exit pupil of the photographing lens system is disposed far from the image pickup surface. According to such a constitution, an incidence angle of a ray upon the image pickup surface can be inhibited from being excessively enlarged in the peripheral area of the image pickup surface of the image sensor. As a result, decrease of a quantity of light in the peripheral area of an image and deterioration of a color reproduction property are inhibited.

On the other hand, in recent years, there are electronic image sensors that use a technology in which an arrangement of a micro lens disposed right before each pixel is devised with respect to each pixel to improve an oblique incidence property upon the image pickup surface.

The exit pupil is far from the image surface, and the incidence angle of the light flux upon the image pickup surface is close to zero. A zoom lens system including a refractive power layout having positive, negative, positive and negative powers from the object side is disclosed in, for example, Japanese Patent Application Laid-Open Nos. 09-197272 and 04-53916.

BRIEF SUMMARY OF THE INVENTION

A zoom lens system according to the present invention comprises, in order from an object side: a first lens unit having a positive refractive power; a second lens unit having a negative refractive power; a third lens unit having a positive refractive power; and a fourth lens unit having a negative refractive power.

During zooming from a wide-angle end to a telephoto end, a space between the first lens unit and the second lens unit enlarges, a space between the second lens unit and the third lens unit narrows, a space between the third lens unit and the fourth lens unit changes, and all of the first to fourth lens units move along an optical axis.

Further, the zoom lens system has an aperture stop which moves integrally with the third lens unit during the zooming.

The above constitution is common to the zoom lens system of the present invention.

Furthermore, in one aspect of the present invention, the fourth lens unit includes one negative lens element.

In addition, according to another aspect of the present invention, the first lens unit includes one positive lens element.

Moreover, according to still another aspect of the present invention, the third lens unit satisfies the following condition:

$$1 < f_3/f_W < 2,$$

in which $f_3$ is a focal length of the third lens unit, and $f_W$ is a focal length of the zoom lens system in the wide-angle end.

Furthermore, according to a further aspect of the present invention, the second lens unit comprises two lenses including a negative lens element and a positive lens element in order from the object side, and satisfies the following condition:

$$1.85 < N_{2P}; \text{ and}$$

$$1.74 < N_{2N},$$

in which $N_{2P}$ is a refractive index of the positive lens element of the second lens unit for the d-line, and $N_{2N}$ is a refractive index of the negative lens element of the second lens unit for the d-line.

Other features and advantages of the present invention will become apparent from the following detailed description of the examples when taken in conjunction with the accompanying drawings and appended claims.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION OF THE PREFERRED EMBODIMENT

Figure 1A:
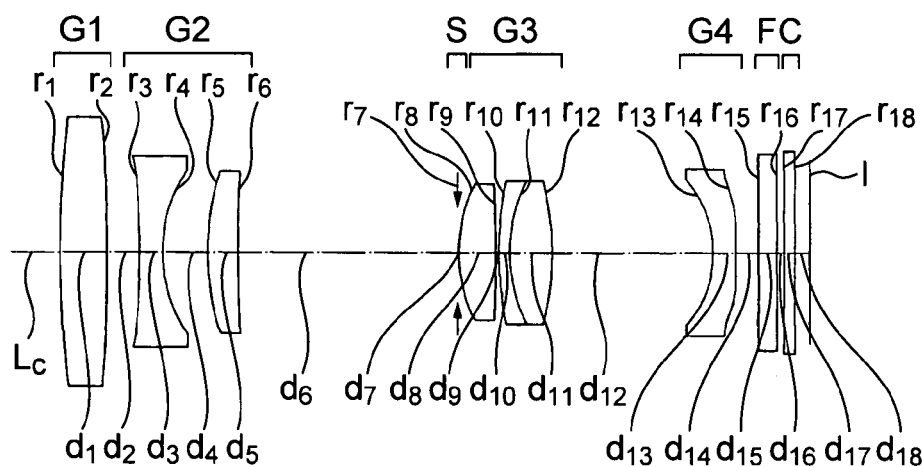
FIGS. 1A to 1C are sectional views of Example 1 of a zoom lens system according to the present invention when focused on an infinite object.

As described above, a basic constitution of a zoom lens system according to the present invention includes, in order from an object side: a first lens unit having a positive refractive power; a second lens unit having a negative refractive power; a third lens unit having a positive refractive power; and a fourth lens unit having a negative refractive power.

During zooming from a wide-angle end to a telephoto end, a space between the first lens unit and the second lens unit enlarges, a space between the second lens unit and the third lens unit narrows, a space between the third lens unit and the fourth lens unit changes, and all of the first to fourth lens units move along an optical axis.

The zoom lens system has an aperture stop which moves integrally with the third lens unit during the zooming.

In the above movement system, the second lens unit having the negative refractive power and the third lens unit having the positive refractive power have a magnification change function. While the space between the third lens unit and the fourth lens unit having the negative refractive power is changed, all of the first to fourth lens units are moved to perform the zooming. In consequence, aberration correction and a movement amount of each lens unit are appropriately easily balanced. As a result, the constitution is advantageous in securing a zoom ratio.

Moreover, the aperture stop is integrated with the third lens unit. In consequence, it is possible to suppress a height of a position of the third lens unit from the optical axis, through which an off-axial ray passes. The third lens unit can be constituted to be compact.

Furthermore, the third lens unit has the magnification change function, but in view of an aberration correcting function, the third lens unit mainly has a function of correcting an axial aberration. Therefore, an off-axial aberration is little influenced by the movement of the third lens unit, and a degree of freedom in lens constitution of the third lens unit can be improved.

In addition to the above basic constitution, according to one aspect of the zoom lens system of the present invention, it is preferable that the fourth lens unit is constituted of one negative lens element.

When the fourth lens unit is a lens unit having a negative refractive power, a chromatic aberration of magnification in the wide-angle end is advantageously corrected. This respect will be described in more detail. When the lens units and the aperture stop are arranged as described above, a burden of the magnification change function is imposed on the second and third lens units, and an influence of the aberration is suppressed. Therefore, a large burden of the magnification change function is not imposed on the fourth lens unit.

On the other hand, when the fourth lens unit having the negative refractive power comes away from the aperture stop in order to correct the chromatic aberration of magnification, an outer diameter of the fourth lens unit increases.

Therefore, it is preferable that the fourth lens unit is constituted of one negative lens element. In this constitution, while an effect of correction of the chromatic aberration of magnification is maintained, the number of the lenses can be reduced.

Moreover, in a case where the fourth lens unit is constituted of one negative lens element, when a collapsible lens barrel is used as a lens barrel of the zoom lens system, a thickness of the lens system when collapsed is easily reduced. Therefore, when the zoom lens system is used in an image pickup apparatus, the image pickup apparatus is advantageously miniaturized in a thickness direction.

It is preferable that the negative lens element of the fourth lens unit has refractive surfaces on the object side and an image side, which are inclined toward the object side in the portion thereof distant from an optical axis. It is also preferable to satisfy the following condition:

$$-2.0 < (RL_{41F} + RL_{41R})/(RL_{41F} - RL_{41R}) < -0.1 \quad (1),$$

in which $RL_{41F}$ is a paraxial radius of curvature of the object-side surface of the negative lens element of the fourth lens unit, and $RL_{41R}$ is a paraxial radius of curvature of the image-side surface of the negative lens element of the fourth lens unit.

The condition (1) is a condition for easily obtaining the aberration correcting function of the fourth lens unit. Fluctuations of the off-axial aberration are easily reduced by forming the fourth lens unit into the above shape. When $(RL_{41F} + RL_{41R})/(RL_{41F} - RL_{41R})$ is not below a lower limit of the condition (1), it is possible to prevent the negative lens element from being an extreme meniscus shape. This constitution is preferable to reduce generation of a higher order aberration on the object-side surface.

When $(RL_{41F} + RL_{41R})/(RL_{41F} - RL_{41R})$ is not above an upper limit of the condition (1), it is possible to prevent an incidence angle of the off-axial ray onto the image-side surface from being excessively large. In consequence, it is easy to obtain an effect of adjusting an aberration balance by moving the fourth lens unit. If $(RL_{41F} + RL_{41R})/(RL_{41F} - RL_{41R})$ is above the upper limit of the condition (1), the image-side surface of the negative lens element has a complicated aspherical shape. Therefore, it is difficult to correct the influence of the aberration due to eccentricity of the negative lens element by using eccentricity of another lens, and a high precision is required in assembling of the zoom lens system.

It is preferable that both of the object-side surface and the image-side surface of the fourth lens unit are aspherical surfaces.

Since the fourth lens unit is disposed away from the aperture stop and both of an axial light flux and an off-axial light flux are comparatively thin in the position of the fourth lens unit, the axial light flux does not overlap the off-axial light flux in the fourth lens unit. Therefore, it is preferable that both of the object-side surface and the image-side surface of the fourth lens unit are aspherical surfaces and that these aspherical surfaces are formed into such shapes as to balance both of the axial aberration and the off-axial aberration. It is preferable to use two aspherical surfaces. This is because the aspherical surface can be prevented from being formed into extreme shapes (a departure of the aspherical surface from a reference sphere can be prevented from being excessively large) while a satisfactory aberration is kept.

In addition to the above basic constitution, in another aspect of the zoom lens system of the present invention, it is preferable that the first lens unit is constituted of one positive lens element.

The number of the lenses of the first lens unit is a minimum number of one. Therefore, even if an angle of field is broadened, an incidence height of the ray upon a lens surface closest to the object side can be suppressed. In consequence, the outer diameter is advantageously reduced. The thickness of the first lens unit is also reduced. The constitution is also advantageous in achieving a compact collapsible structure.

It is preferable that the positive lens element of the first lens unit satisfies the following condition:

$$-1.5 < (RL_{11F} + RL_{11R})/(RL_{11F} - RL_{11R}) < 0 \quad (2),$$

in which $RL_{11F}$ is a paraxial radius of curvature of the object-side surface of the positive lens element of the first lens unit, and $RL_{11R}$ is a paraxial radius of curvature of the image-side surface of the positive lens element of the first lens unit.

When $(RL_{11F} + RL_{11R})/(RL_{11F} - RL_{11R})$ is not below a lower limit of the condition (2) and a curvature of the object-side surface of the positive lens element of the first lens unit is reduced, a spherical aberration in a telephoto end is easily suppressed.

Moreover, when $(RL_{11F} + RL_{11R})/(RL_{11F} - RL_{11R})$ is not above an upper limit of the condition (2) and the curvature of the image-side surface of the positive lens element of the first lens unit is reduced, the incidence angle of the off-axial light flux in the wide-angle end can be reduced to inhibit generation of the aberration.

It is more preferable that the positive lens element of the first lens unit satisfies the following condition:

$$62.0 < \nu_{L11} < 95.0 \quad (3),$$

in which $\nu_{L11}$ is the Abbe number of the positive lens element of the first lens unit.

When the first lens unit is constituted of one positive lens element, it is preferable to inhibit the generation of the chromatic aberration of magnification of the first lens unit in the wide-angle end and the generation of the axial chromatic aberration in the telephoto end. When $\nu_{L11}$ is not below a lower limit of the condition (3) and dispersion of the positive lens is relatively low, the chromatic aberration of the first lens unit is easily suppressed.

It is preferable that $\nu_{L11}$ is not above an upper limit of the condition (3) and that cost of a material for use is reduced. The material having low dispersion tends to have a small refractive index. Therefore, it is preferable that $\nu_{L11}$ is not above the upper limit of the condition (3). While the power of the first lens unit is secured, the total length is reduced, and the curvature of the surface is easily suppressed.

Moreover, when the first lens unit is constituted of one positive lens element as described above, it is more preferable to satisfy the following condition:

$$0.15 < D_{12T}/(D_{23W} - D_{23T}) < 0.70 \quad (4),$$

in which $D_{12T}$ is an axial space between the first lens unit and the second lens unit in the telephoto end, $D_{23W}$ is an axial space between the second lens unit and the third lens unit in the wide-angle end, and $D_{23T}$ is an axial space between the second lens unit and the third lens unit in the telephoto end.

When the first lens unit is constituted of one positive lens element, it is preferable that the second lens unit having the negative refractive power has a function of canceling an aberration such as the spherical aberration generated in the positive lens element. The spherical aberration tends to be conspicuous in the telephoto end. In this case, it is preferable that the space between the first lens unit and the second lens unit is prevented from being excessively enlarged. In consequence, the diameter of the axial light flux in the first lens unit is reduced, the diameter of the axial light flux in the second lens unit is secured, and the aberration balance is kept.

It is preferable that $D_{12T}/(D_{23W} - D_{23T})$ is not below a lower limit of the condition (4). In consequence, an appropriate axial space between the first lens unit and the second lens unit in the telephoto end is secured, and an effect of a telephoto arrangement is secured.

It is preferable that $D_{12T}/(D_{23W} - D_{23T})$ is not above an upper limit of the condition (4). In consequence, while the third lens unit has a magnification change function, the axial space between the first lens unit and the second lens unit in the telephoto end is reduced, and the aberrations of the first and second lens units are easily cancelled each other out.

Moreover, it is more preferable that the zoom lens system further satisfies the following condition in addition to the above condition (4):

$$0.03 < (D_{12T} - D_{12W})/(D_{23W} - D_{23T}) < 0.60 \quad (5),$$

in which $D_{12W}$ is an axial space between the first lens unit and the second lens unit in the wide-angle end, $D_{12T}$ is an axial space between the first lens unit and the second lens unit in the telephoto end, $D_{23W}$ is an axial space between the second lens unit and the third lens unit in the wide-angle end, and $D_{23T}$ is an axial space between the second lens unit and the third lens unit in the telephoto end.

The condition (5) defines a ratio between a change amount of the axial space between the first lens unit and the second lens unit and a change amount of the axial space between the second lens unit and the third lens unit.

It is preferable that $(D_{12T} - D_{12W})/(D_{23W} - D_{23T})$ is not below a lower limit of the condition (5). In this case, during the zooming from the wide-angle end to the telephoto end, an increase amount of the axial space between the first lens unit and the second lens unit is secured. In consequence, the burden of the magnification change function of the second lens unit is secured.

It is preferable that $(D_{12T} - D_{12W})/(D_{23W} - D_{23T})$ is not above an upper limit of the condition (5). In consequence, an aberration fluctuation due to a change of the axial space between the first lens unit and the second lens unit is suppressed.

It is to be noted that the constitution in which the fourth lens unit is constituted of one negative lens element and the first lens unit is constituted of one positive lens element, is more advantageous for miniaturization of the zoom lens system. In this case, it is preferable that the zoom lens system is constituted so as to satisfy the above conditions. In consequence, the functions and effects described above are obtained.

Moreover, the zoom lens system may be constituted such that the fourth lens unit is constituted of one negative lens element and the first lens unit is constituted of one cemented lens component including a negative lens element and a positive lens element in order from the object side.

As described above, the first lens unit can be constituted of one positive single lens element. However, instead of this constitution, the first lens unit may be constituted of a cemented lens component including a negative lens element and a positive lens element, and the fourth lens unit may be constituted of one negative lens element. In consequence, while the fluctuation of the chromatic aberration of magnification due to the magnification change is controlled, the zoom lens system is easily miniaturized. A degree of freedom in designing surface shapes of the object-side surface and the image-side surface of the first lens unit can be secured, and off-axial aberrations are easily balanced. As a result, this constitution is advantageous in reducing a length of the second lens unit.

Especially, when the system is collapsed and stored as described above, the thickness of the lens unit is easily reduced. Therefore, the constitution is advantageous for the miniaturization of the image pickup apparatus.

It is to be noted that as compared with a case where two lenses of the first lens unit are not cemented, in a case where the first lens unit is constituted of a cemented lens component of two lenses, precision of a space between these two lenses and precision in suppressing the eccentricity can easily be ensured. Further, this constitution is advantageous to reduce the outer diameter of the first lens unit when the angle of view at the wide-angle end of the zoom lens system is broadened.

It is preferable that the above cemented lens component satisfies the following condition:

$$-1.5 < (RL_{ceF} + RL_{ceR})/(RL_{ceF} - RL_{ceR}) < 0 \quad (6),$$

in which $RL_{ceF}$ is a paraxial radius of curvature of the object-side surface of the cemented lens component of the first lens unit, and $RL_{ceR}$ is a paraxial radius of curvature of the image-side surface of the cemented lens component of the first lens unit.

When $(RL_{ceF} + RL_{ceR})/(RL_{ceF} - RL_{ceR})$ is not below a lower limit of the condition (6) and the curvature of the object-side surface of the cemented lens component of the first lens unit is suppressed, the spherical aberration in the telephoto end is easily suppressed.

When $(RL_{ceF} + RL_{ceR})/(RL_{ceF} - RL_{ceR})$ is not above an upper limit of the condition (6) and the curvature of the image-side surface of the cemented lens component of the first lens unit is suppressed, the incidence angle of the off-axial light flux in the wide-angle region can be suppressed to inhibit the generation of the aberration.

Moreover, when the first lens unit is constituted of the cemented lens component, it is preferable to satisfy the following condition:

$$0.75 < D_{12T}/(D_{23W} - D_{23T}) < 1.30 \quad (7),$$

in which $D_{12T}$ is an axial space between the first lens unit and the second lens unit in the telephoto end, $D_{23W}$ is an axial space between the second lens unit and the third lens unit in the wide-angle end, and $D_{23T}$ is an axial space between the second lens unit and the third lens unit in the telephoto end.

The first lens unit constituted of the above cemented lens component is advantageous in inhibiting the generation of the aberration as compared with the first lens unit constituted of the single lens. Therefore, it is preferable to secure an appropriate axial space between the first lens unit and the second lens unit in the telephoto end and to enlarge an entrance pupil to secure brightness.

It is preferable that $D_{12T}/(D_{23W} - D_{23T})$ is not below a lower limit of the condition (7). In consequence, an appropriate axial space between the first lens unit and the second lens unit in the telephoto end can be secured to secure the brightness.

It is preferable that $D_{12T}/(D_{23W} - D_{23T})$ is not above an upper limit of the condition (7). In consequence, while the third lens unit has the magnification change function, the axial space between the first lens unit and the second lens unit in the telephoto end is reduced to reduce the total length of the zoom lens system.

It is more preferable that the zoom lens system further satisfies the following condition in addition to the above condition (7):

$$0.70 < (D_{12T} - D_{12W})/(D_{23W} - D_{23T}) < 1.10 \quad (8),$$

in which $D_{12W}$ is an axial space between the first lens unit and the second lens unit in the wide-angle end, $D_{12T}$ is an axial space between the first lens unit and the second lens unit in the telephoto end, $D_{23W}$ is an axial space between the second lens unit and the third lens unit in the wide-angle end, and $D_{23T}$ is an axial space between the second lens unit and the third lens unit in the telephoto end.

The condition (8) defines a ratio between the change amount of the axial space between the first lens unit and the second lens unit and the change amount of the axial space between the second lens unit and the third lens unit.

It is preferable that $(D_{12T} - D_{12W})/(D_{23W} - D_{23T})$ is not below a lower limit of the condition (8) and is not above an upper limit of the condition (8). In this case, a difference between the change amount of the axial space between the first lens unit and the second lens unit and that of the axial space between the second lens unit and the third lens unit is reduced. In consequence, a zoom ratio is secured, and the aberration fluctuations are reduced.

It is preferable that in any of the above zoom lens systems, the third lens unit satisfies the following condition:

$$0.8 < f_3/f_W < 3 \quad (9),$$

in which $f_3$ is a focal length of the third lens unit, and $f_W$ is a focal length of the zoom lens system in the wide-angle end.

The condition (9) is a condition for reducing the aberration correcting burden on each lens unit and achieving a compact zoom lens system in the zoom lens system including the lens units having positive, negative, positive and negative refractive powers in order from the object side.

It is preferable that $f_3/f_W$ is not below a lower limit of the condition (9) and that an excessively strong refractive power of the third lens unit is not set. In consequence, the aberration of the third lens unit is easily suppressed. The negative refractive powers of the second and fourth lens units are easily suppressed. This constitution is preferable in correcting the aberration.

It is preferable that $f_3/f_W$ is not above an upper limit of the condition (9) and that the refractive power of the third lens unit is secured to secure the burden of the magnification change function on the third lens unit. When the positive refractive power of the third lens unit is secured, the negative refractive power of the fourth lens unit is effectively maintained, and the off-axial chromatic aberration correcting function of the fourth lens unit is effectively maintained.

Moreover, in addition to the above basic constitution, in a still another aspect of the zoom lens system of the present invention, it is preferable that the third lens unit of the zoom lens system satisfies the following condition:

$$1 < f_3/f_W < 2 \quad (10),$$

in which $f_3$ is a focal length of the third lens unit, and $f_W$ is a focal length of the zoom lens system in the wide-angle end.

The condition (10) further limits the upper limit value and the lower limit value of the above condition (9) ($0.8 < f_3/f_W < 3$). In consequence, the whole aberration and the miniaturization are easily balanced.

It is preferable that $f_3/f_W$ is not below a lower limit of the condition (10) and that an excessively strong refractive power of the third lens unit is not set. In consequence, the aberration of the third lens unit is easily suppressed. The negative refractive powers of the second and fourth lens units are also easily suppressed. This constitution is preferable in correcting the aberration.

It is preferable that $f_3/f_W$ is not above an upper limit of the condition (10) and that the refractive power of the third lens unit is secured to secure the magnification change burden on the third lens unit. When the positive refractive power of the third lens unit is secured, the negative refractive power of the third lens unit is effectively maintained, and the fourth lens unit effectively maintains the function of correcting the off-axial chromatic aberration.

Moreover, it is preferable that the first lens unit of any of the above zoom lens systems satisfies the following condition:

$$3 < f_1/f_W < 20 \quad (11),$$

in which $f_1$ is a focal length of the first lens unit, and $f_W$ is a focal length of the zoom lens system in the wide-angle end.

It is preferable that $f_1/f_W$ is not below a lower limit of the condition (1) and that the refractive power of the first lens unit is suppressed. In consequence, an amount of the aberration to be generated can be suppressed. This contributes to simplification of the constitution such as reduction of the number of the lenses constituting the first lens unit. A composite refractive power of the first and second lens units in the wide-angle end is easily set to be negative. The whole zoom lens system can be of a retro focus type in the wide-angle end. Therefore, the angle of field is advantageously secured.

It is preferable that $f_1/f_W$ is not above an upper limit of the condition (11) and that an appropriate refractive power of the first lens unit is secured. In consequence, a magnification change effect due to the change of the space between the first lens unit and the second lens unit is easily secured. In the zoom lens system of the present invention, the second lens unit and the third lens unit share the magnification change function. Therefore, when the magnification change effect due to the change of the space between the first lens unit and the second lens unit is secured, the constitutions of the lens units subsequent to the second lens unit can be simplified.

Furthermore, in any of the above zoom lens systems, it is preferable that the third lens unit is disposed closer to the object side in the telephoto end than in the wide-angle end, and satisfies the following condition:

$$0.5 < X_3/f_W < 2.0 \quad (12),$$

in which $X_3$ is a displacement amount of the third lens unit during the zooming from the wide-angle end to the telephoto end, and $f_W$ is a focal length of the zoom lens system in the wide-angle end.

It is preferable to move the third lens unit so that $X_3/f_W$ is not below a lower limit of the condition (12) to thereby secure the magnification change function of the third lens unit.

It is preferable to appropriately limit the movement of the third lens unit so that $X_3/f_W$ is not above an upper limit of the condition (12) to thereby suppress the fluctuation of a position of an exit pupil during the magnification change.

Moreover, it is preferable in any of the above zoom lens systems that the second lens unit is constituted of two lens elements including a negative lens element and a positive lens element in order from the object side and that the following conditions are satisfied:

$$1.85 < N_{2P} \quad (13); \text{ and}$$

$$1.74 < N_{2N} \quad (14),$$

in which $N_{2P}$ is a refractive index of the positive lens element of the second lens unit for the d-line, and $N_{2N}$ is a refractive index of the negative lens element of the second lens unit for the d-line.

When the second lens unit is constituted by arranging the negative lens element and the positive lens element in order from the object side, the chromatic aberration can satisfactorily be corrected in the second lens unit with the small number of the lens elements. A principal point can be positioned closer to the object side, and the position of the entrance pupil can be adjusted (a distance from the incidence surface of the zoom lens system to the incidence pupil can be reduced). In consequence, the outer diameter of the lens element of the first lens unit can be reduced. At this time, when the powers of the two lens elements are strengthened, a large effect can be obtained by the adjustment of the principal point position. However, to suppress the aberration of this lens unit, it is preferable that the conditions (13), (14) are satisfied.

In a case where $N_{2P}$, $N_{2N}$ satisfy the conditions (13), (14), even when the negative refractive power of the negative lens element and the positive refractive power of the positive lens element of the second lens unit are strengthened, the curvature of each lens surface is inhibited from being enlarged. Since the small number of the lenses constitutes the second lens unit, a length of the second lens unit itself can be shortened, and the outer diameters of the first and second lens units can be reduced.

Moreover, in addition to the above basic constitution, it is preferable in a further aspect of the zoom lens system according to the present invention that the second lens unit is constituted of two lenses including a negative lens and a positive lens in order from the object side and that the following conditions are satisfied:

$$1.85 < N_{2P} \quad (13); \text{ and}$$

$$1.74 < N_{2N} \quad (14),$$

in which $N_{2P}$ is a refractive index of the positive lens element of the second lens unit for the d-line, and $N_{2N}$ is a refractive index of the negative lens element of the second lens unit for the d-line.

As described above, when the second lens unit is constituted by arranging the negative lens element and the positive lens element in order from the object side, the chromatic aberration can satisfactorily be corrected in the second lens unit with the small number of the lens elements. The principal point can be positioned closer to the object side, and the position of the entrance pupil can be adjusted (the distance from the incidence surface of the zoom lens system to the entrance pupil can be reduced). In consequence, the outer diameter of the lens element of the first lens unit can be reduced. At this time, when the powers of the two lens elements are strengthened, a larger effect can be obtained by the adjustment of the principal point position. However, to suppress the aberration of this lens unit, it is preferable that the conditions (13) and (14) are satisfied.

In a case where $N_{2P}$, $N_{2N}$ satisfy the conditions (13) and (14), even when the negative refractive power of the negative lens element and the positive refractive power of the positive lens element of the second lens unit are strengthened, the curvature of each lens surface is inhibited from being enlarged. Since the small number of the lenses constitutes the second lens unit, the length of the second lens unit itself can be shortened, and the outer diameters of the first and second lens units can be reduced.

It is to be noted that in any of the above zoom lens systems, the first lens unit may be constituted of one positive lens element, the second lens unit may be constituted of two lenses including a negative lens element and a positive lens element in order from the object side, and the fourth lens unit may be constituted of one negative lens element. According to this constitution, while a performance is kept, the number of the lens elements constituting the zoom lens system can be reduced. In consequence, the number of the lens elements can be reduced with good balance. The constitution is also advantageous for the miniaturization of the zoom lens system when collapsed.

Furthermore, in any of the above zoom lens systems, the first lens unit may be constituted of two lens elements including a negative lens element and a positive lens element in order from the object side, the second lens unit may be constituted of two lens elements including the negative lens element and the positive lens element in order from the object side, and the fourth lens unit may be constituted of one negative lens element. In consequence, the number of the lens elements can be reduced with good balance. The constitution is also advantageous for the miniaturization of the zoom lens system when collapsed.

In addition, it is preferable in any of the zoom lens systems that the third lens unit is constituted of three lens elements including a positive lens element, a negative lens element and a positive lens element in order from the object side.

When the third lens unit is moved integrally with the aperture stop, the incidence height of the ray upon the third lens unit is lowered. When the third lens unit is constituted of the lens elements as described above, the third lens unit is miniaturized, the generation of the aberration in the third lens unit is easily inhibited, and the burden of the magnification change function is easily imposed on the third lens unit.

In the zoom lens system according to the present invention, it is preferable to dispose the aperture stop right before the third lens unit on the object side.

This arrangement is advantageous in disposing the exit pupil away from an image surface. The arrangement is also advantageous in easily suppressing the incidence height of the off-axial ray upon the first and second lens units and reducing the outer diameter of the lens unit.

The lower limit values and upper limit values of the above conditions can be changed as follows.

It is more preferable from a viewpoint of the aberration correction to set the lower limit value of the condition (1) to −1.7, further preferably −1.55. It is more preferable from the viewpoint of the aberration correction to set the upper limit value to −0.3, further preferably −0.5.

In a case where the first lens unit is constituted of a single lens element, it is more preferable from the viewpoint of the aberration correction to set the lower limit value of the condition (2) to −1.3. It is more preferable from the viewpoint of the aberration correction to set the upper limit value to −0.05.

It is more preferable from the viewpoint of the aberration correction to set the lower limit value of the condition (3) to 75.0. It is more preferable from a viewpoint of cost reduction and miniaturization to set the upper limit value to 90.0.

It is more preferable from the viewpoint of the reduction of the total length of the zoom lens system in the telephoto end to set the lower limit value of the condition (4) to 0.19. It is more preferable from a viewpoint of aberration balance to set the upper limit value to 0.65.

It is more preferable from a viewpoint of the burden of the magnification change function to set the lower limit value of the condition (5) to 0.05. It is more preferable from the viewpoint of the aberration balance to set the upper limit value to 0.40.

When the first lens unit is a cemented lens component, it is more preferable from the viewpoint of the aberration correction to set the lower limit value of the condition (6) to −1.0. It is more preferable from the viewpoint of the aberration correction to set the upper limit value to −0.4.

It is more preferable from a viewpoint of the securing of the brightness to set the lower limit value of the condition (7) to 0.80. It is more preferable from the viewpoint of the miniaturization to set the upper limit value to 1.20.

It is more preferable from the viewpoint of the aberration balance to set the lower limit value of the condition (8) to 0.85. It is more preferable from the viewpoint of the aberration balance to set the upper limit value to 1.05.

It is more preferable from the viewpoint of the aberration correction to change the condition (9) as follows:

$$1 < f_3/f_W < 2.$$

It is more preferable from the viewpoint of the aberration correction to set the lower limit values of the conditions (9) and (10) to 1.05. It is more preferable from the viewpoint of the aberration correction to set the upper limit values to 1.5.

It is more preferable from the viewpoints of the aberration correction and the miniaturization in the wide-angle end to set the lower limit value of the condition (11) to 3.5, further preferably 4.0. It is more preferable from a viewpoint of the securing of the magnification change function to set the upper limit value to 15, further preferably 12.

It is more preferable from the viewpoint of the securing of the magnification change function to set the lower limit value of the condition (12) to 0.8, further preferably 1.1. It is more preferable from the viewpoint of a fluctuation of the position of the exit pupil to set the upper limit value to 1.8, further preferably 1.6.

It is more preferable from the viewpoints of the aberration correction and the miniaturization to set the lower limit value of the condition (13) to 1.90. It is more preferable from the viewpoints of the aberration correction and the miniaturization to set the lower limit value of the condition (14) to 1.80. It is preferable that the upper limit values of the conditions (13) and (14) are set to 2.3 and that the upper limit value is not exceeded in consideration of ease of obtaining the material.

It is to be noted that the above constitutions may arbitrarily be combined.

Figure 1B:
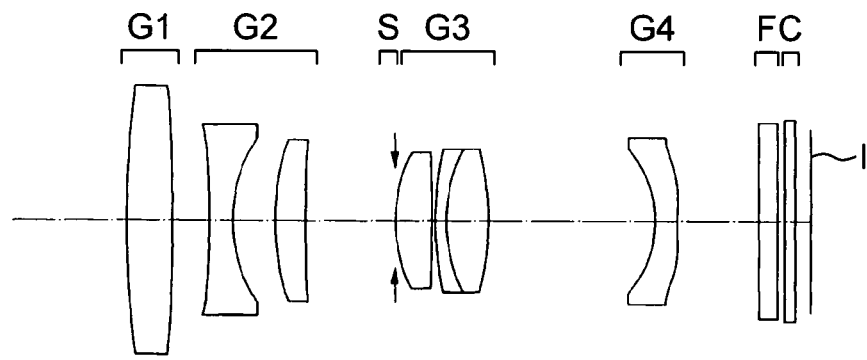
Figure 1C:
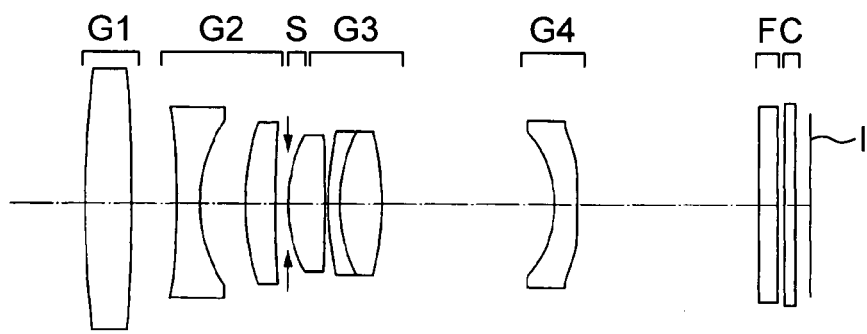
Figure 2A:
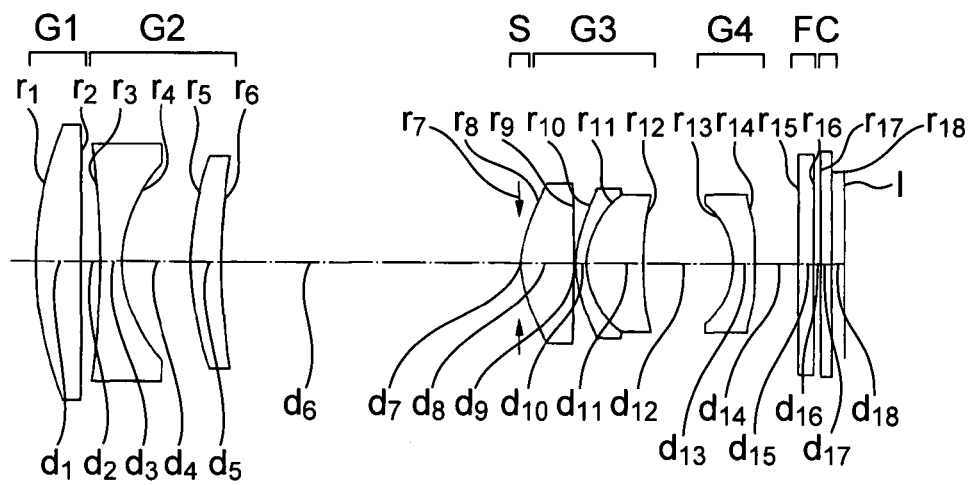
FIGS. 2A to 2C are sectional views of Example 2 of a zoom lens system according to the present invention when focused on an infinite object.
Figure 2B:
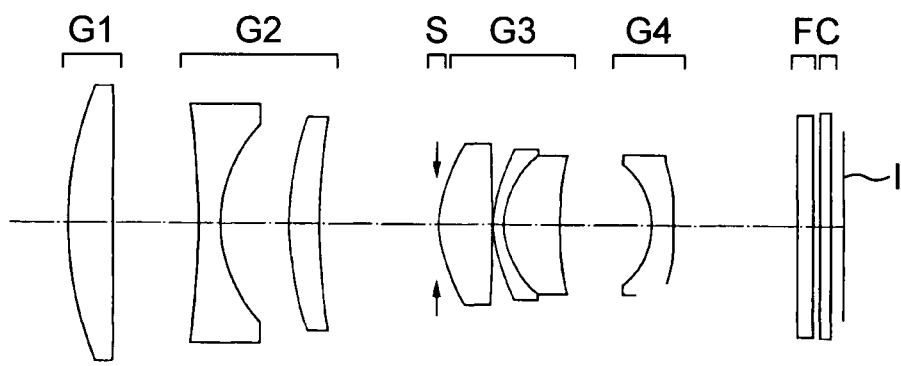
Figure 2C:
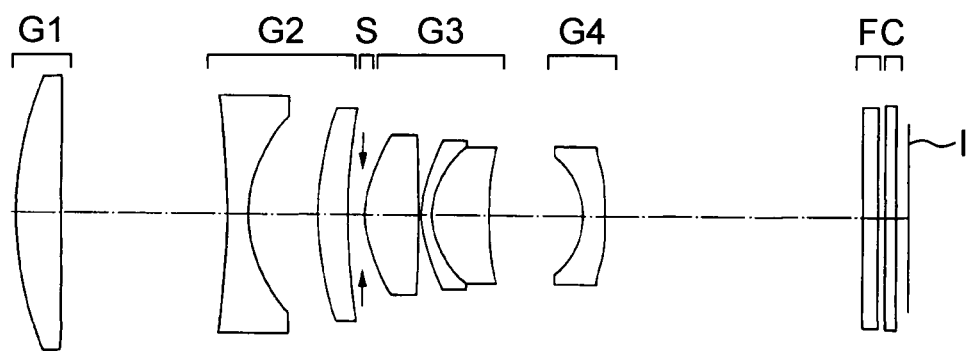
Figure 3A:
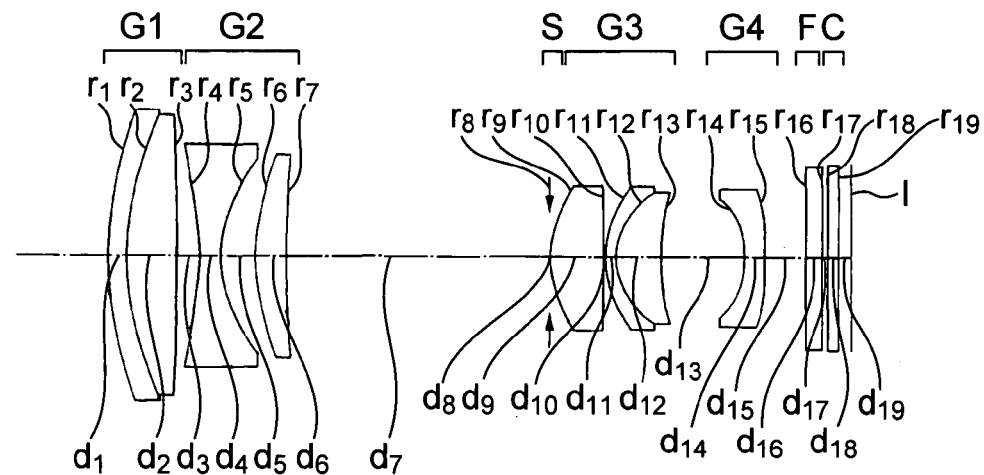
FIGS. 3A to 3C are sectional views of Example 3 of a zoom lens system according to the present invention when focused on an infinite object.
Figure 3B:
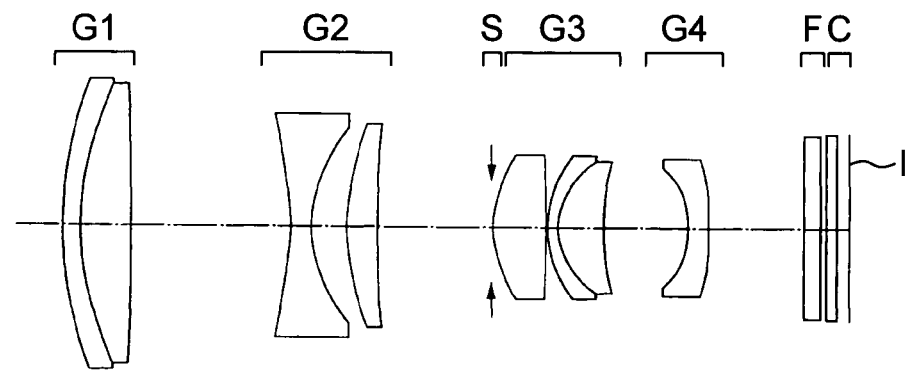
Figure 3C:
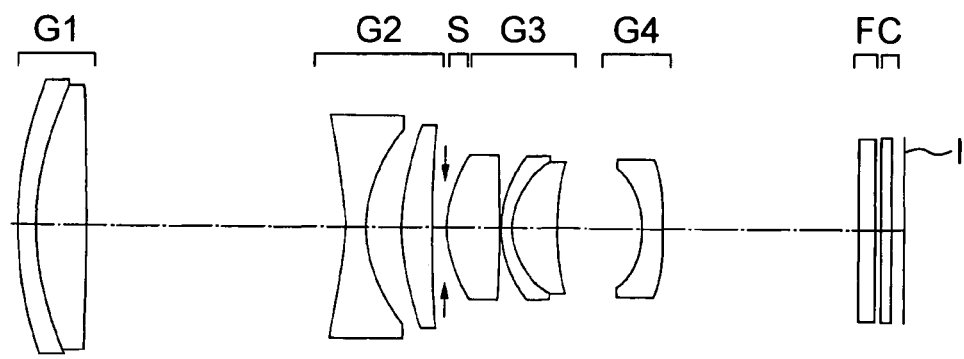

FIGS. 1A to 3C are sectional views of Examples 1 to 3 when focused on an infinitely far object, FIGS. 1A, 2A and 3A show sectional views in a wide-angle end, FIGS. 1B, 2B and 3B show sectional views in an intermediate state, and FIGS. 1C, 2C and 3C show sectional views in a telephoto end. In the drawings, a first lens unit is denoted with G1, a second lens unit is denoted with G2, an aperture stop is denoted with S, a third lens unit is denoted with G3, a fourth lens unit is denoted with G4, and an image surface is denoted with I. A parallel flat plate F is a low pass filter coated with a wavelength band restrictive coating which removes an infrared ray. A parallel flat plate C is a cover glass of an electronic image sensor. It is to be noted that the surface of the cover glass C may be coated with a multilayered thin film for limiting a wavelength band. The cover glass C may have a low pass filter function.

As shown in FIGS. 1A to 1C, a zoom lens system of Example 1 includes, in order from an object side, a first lens unit G1 having a positive refractive power, a second lens unit G2 having a negative refractive power, an aperture stop S, a third lens unit G3 having a positive refractive power and a fourth lens unit G4 having a negative refractive power.

During zooming from a wide-angle end to a telephoto end, the first lens unit G1 once moves toward an image side, and reverses its movement direction to move toward the object side. The second lens unit G2 once moves toward the image side, and reverses its movement direction to move toward the object side. The third lens unit G3 moves toward the object side, and the fourth lens unit G4 moves toward the object side.

The first lens unit G1 is constituted of a first double convex positive lens. The second lens unit is constituted of, in order from the object side, a second double concave negative lens and a third positive meniscus lens whose convex surface faces the object side. The third lens unit is constituted of, in order from the object side, a fourth double convex positive lens, a fifth negative meniscus lens whose convex surface faces the object side and a sixth double convex positive lens. The fifth negative meniscus lens is cemented to the sixth double convex positive lens. The fourth lens unit is constituted of a seventh negative lens which has a double concave shape in the vicinity of an optical axis and whose opposite surfaces are inclined toward the object side in a peripheral portion.

Aspherical surfaces are used on four surfaces including an image-side surface of the second double concave negative lens, an object-side surface of the fourth double convex positive lens and opposite surfaces of the seventh negative lens.

As shown in FIGS. 2A to 2C, a zoom lens system of Example 2 includes, in order from an object side, a first lens unit G1 having a positive refractive power, a second lens unit G2 having a negative refractive power, an aperture stop S, a third lens unit G3 having a positive refractive power and a fourth lens unit G4 having a negative refractive power.

During zooming from a wide-angle end to a telephoto end, the first lens unit G1 once moves toward an image side, and reverses its movement direction to move toward the object side. The second lens unit G2 once moves toward the image side, and reverses its movement direction to move toward the object side. The third lens unit G3 moves toward the object side, and the fourth lens unit G4 moves toward the object side.

The first lens unit G1 is constituted of a first positive meniscus lens whose convex surface faces the object side. The second lens unit G2 is constituted of, in order from the object side, a second double concave negative lens and a third positive meniscus lens whose convex surface faces the object side. The third lens unit G3 is constituted of, in order from the object side, a fourth double convex positive lens, a fifth negative meniscus lens whose convex surface faces the object side and a sixth positive meniscus lens whose convex surface faces the object side. The fifth negative meniscus lens is cemented to the sixth positive meniscus lens. The fourth lens unit G4 is constituted of a seventh negative meniscus lens whose convex surface faces the image side.

Aspherical surfaces are used on five surfaces including an image-side surface of the second double concave negative lens, opposite surfaces of the fourth double convex positive lens and opposite surfaces of the seventh negative meniscus lens.

As shown in FIGS. 3A to 3C, a zoom lens system of Example 3 includes, in order from an object side, a first lens unit G1 having a positive refractive power, a second lens unit G2 having a negative refractive power, an aperture stop S, a third lens unit G3 having a positive refractive power and a fourth lens unit G4 having a negative refractive power.

During zooming from a wide-angle end to a telephoto end, the first lens unit G1 moves toward the object side, the second lens unit G2 moves toward an image side, the third lens unit G3 moves toward the object side, and the fourth lens unit G4 moves toward the object side.

The first lens unit G1 is constituted of, in order from the object side, a first negative meniscus lens whose convex surface faces the object side, and a second double convex positive lens. The first negative meniscus lens is cemented to the second double convex positive lens. The second lens unit is constituted of, in order from the object side, a third double concave negative lens and a fourth positive meniscus lens whose convex surface faces the object side. The third lens unit G3 is constituted of, in order from the object side, a fifth double convex positive lens, a sixth negative meniscus lens whose convex surface faces the object side and a seventh positive meniscus lens whose convex surface faces the object side. The sixth negative meniscus lens is cemented to the seventh positive meniscus lens. The fourth lens unit G4 is constituted of an eighth negative meniscus lens whose convex surface faces the image side.

Aspherical surfaces are used on five surfaces including an image-side surface of the third double concave negative lens, opposite surfaces of the fifth double convex positive lens and opposite surfaces of the eighth negative meniscus lens.

Numerical data of the above examples will hereinafter be described. In addition to the above symbols, f is a focal length of the zoom lens system; $F_{NO}$ is the F-number; $\omega$ is a half angle of view; WE is a wide-angle end; ST is an intermediate state; TE is a telephoto end; $r_1, r_2 \ldots$ are paraxial radii of curvatures of lens surfaces; $d_1, d_2 \ldots$ are spaces between the lens surfaces; $n_{d1}, n_{d2} \ldots$ are refractive indices of the lenses for the d-line; and $v_{d1}, v_{d2} \ldots$ are the Abbe numbers of the lenses. The symbol "*" indicates that the surface is an aspherical surface, the symbol (S) indicates that the surface is an aperture stop and the symbol (I) indicates that the surface is an image surface. t is to be noted that a shape of the aspherical surface is represented by the following equation in a coordinate system in which an intersection between the aspherical surface and the optical axis is an origin, an optical axis is a z-axis whose positive direction is set toward the light traveling direction, and a y-axis is an axis of an arbitrary direction crossing the optical axis at right angles and passing the origin:

$$z=(y^2/R)/[1+\{1-(K+1)(y/R)^2\}^{1/2}]+A_4 y^4+A_6 y^6+A_8 y^8+A_{10} y^{10}+A_{12} y^{12},$$

in which R is a paraxial radius of curvature, K is a conic constant, and $A_4, A_6, A_8, A_{10}$ and $A_{12}$ are 4-th, 6-th, 8-th, 10-th and 12-th order aspherical coefficients. In the aspherical coefficient, "e-n" (n is an integer) means multiplication by "10-n". Therefore, the 4-th order aspherical coefficient of the fourth surface of the following Example 1 may be written as "−4.04350×10⁻⁴".

EXAMPLE 1

| | | | |
|---|---|---|---|
| $r_1 = 63.791$ | $d_1 = 2.00$ | $n_{d1} = 1.49700$ | $v_{d1} = 81.54$ |
| $r_2 = -79.329$ | $d_2 =$ (variable) | | |
| $r_3 = -27.447$ | $d_3 = 1.00$ | $n_{d2} = 1.88300$ | $v_{d2} = 40.76$ |
| $r_4 = 6.354*$ | $d_4 = 2.00$ | | |
| $r_5 = 12.933$ | $d_5 = 1.28$ | $n_{d3} = 1.92286$ | $v_{d3} = 20.88$ |
| $r_6 = 56.865$ | $d_6 =$ (variable) | | |
| $r_7 = \infty$ (S) | $d_7 = 0.00$ | | |
| $r_8 = 5.673*$ | $d_8 = 1.66$ | $n_{d4} = 1.49700$ | $v_{d4} = 81.54$ |
| $r_9 = -96.181$ | $d_9 = 0.10$ | | |
| $r_{10} = 13.906$ | $d_{10} = 0.50$ | $n_{d5} = 2.00069$ | $v_{d5} = 25.46$ |
| $r_{11} = 6.516$ | $d_{11} = 1.92$ | $n_{d6} = 1.52249$ | $v_{d6} = 59.84$ |
| $r_{12} = -14.038$ | $d_{12} =$ (variable) | | |
| $r_{13} = -11.085*$ | $d_{13} = 1.00$ | $n_{d7} = 1.69350$ | $v_{d7} = 53.21$ |
| $r_{14} = 56.661*$ | $d_{14} =$ (variable) | | |
| $r_{15} = \infty$ | $d_{15} = 0.86$ | $n_{d8} = 1.53996$ | $v_{d8} = 59.45$ |
| $r_{16} = \infty$ | $d_{16} = 0.27$ | | |

-continued

| | | | |
|---|---|---|---|
| $r_{17} = \infty$ | $d_{17} = 0.50$ | $n_{d9} = 1.51633$ | $v_{d9} = 64.14$ |
| $r_{18} = \infty$ | $d_{18} = 0.60$ | | |
| $r_{19} = \infty$ (I) | | | |

Aspherical coefficient

4th surface

R = 6.354
K = 0.000
$A_4 = -4.04350e-04$    $A_6 = -7.39240e-06$
$A_8 = 1.68022e-07$    $A_{10} = -2.57246e-08$

8th surface

R = 5.673
K = 0.000
$A_4 = -8.82642e-04$    $A_6 = -2.38183e-05$
$A_8 = 1.33282e-06$

13th surface

R = -11.085
K = -79.924
$A_4 = -1.73180e-02$    $A_6 = 1.99882e-03$
$A_8 = -3.04575e-04$    $A_{10} = 1.82465e-05$

14th surface

R = 56.661
K = 0.000
$A_4 = -8.50397e-03$    $A_6 = 7.36188e-04$
$A_8 = -7.27057e-05$    $A_{10} = 3.35198e-06$

Zoom Data ($\infty$)

| | WE | ST | TE |
|---|---|---|---|
| f(mm) | 6.77 | 11.62 | 19.78 |
| $F_{NO}$ | 3.15 | 4.18 | 5.90 |
| $2\omega(°)$ | 61.39 | 36.33 | 21.69 |
| $d_2$ | 1.43 | 1.60 | 1.98 |
| $d_6$ | 9.80 | 3.90 | 0.54 |
| $d_{12}$ | 7.10 | 7.42 | 7.72 |
| $d_{14}$ | 0.99 | 3.60 | 8.07 |

EXAMPLE 2

| | | | |
|---|---|---|---|
| $r_1 = 17.307$ | $d_1 = 2.10$ | $n_{d1} = 1.49700$ | $v_{d1} = 81.54$ |
| $r_2 = 707.741$ | $d_2 = $ (variable) | | |
| $r_3 = -30.387$ | $d_3 = 1.00$ | $n_{d2} = 1.80610$ | $v_{d2} = 40.92$ |
| $r_4 = 5.676*$ | $d_4 = 3.33$ | | |
| $r_5 = 13.512$ | $d_5 = 1.50$ | $n_{d3} = 1.92286$ | $v_{d3} = 20.88$ |
| $r_6 = 32.467$ | $d_6 = $ (variable) | | |
| $r_7 = \infty$(S) | $d_7 = 0.00$ | | |
| $r_8 = 5.515*$ | $d_8 = 2.60$ | $n_{d4} = 1.49700$ | $v_{d4} = 81.54$ |
| $r_9 = -104.444*$ | $d_9 = 0.10$ | | |
| $r_{10} = 6.348$ | $d_{10} = 0.50$ | $n_{d5} = 2.00069$ | $v_{d5} = 25.46$ |
| $r_{11} = 4.030$ | $d_{11} = 2.73$ | $n_{d6} = 1.56384$ | $v_{d6} = 60.67$ |
| $r_{12} = 13.420$ | $d_{12} = $ (variable) | | |
| $r_{13} = -4.071*$ | $d_{13} = 1.00$ | $n_{d7} = 1.48749$ | $v_{d7} = 70.41$ |
| $r_{14} = -19.326*$ | $d_{14} = $ (variable) | | |
| $r_{15} = \infty$ | $d_{15} = 0.86$ | $n_{d8} = 1.53996$ | $v_{d8} = 59.45$ |
| $r_{16} = \infty$ | $d_{16} = 0.27$ | | |
| $r_{17} = \infty$ | $d_{17} = 0.50$ | $n_{d9} = 1.51633$ | $v_{d9} = 64.14$ |
| $r_{18} = \infty$ | $d_{18} = 0.60$ | | |
| $r_{19} = \infty$(I) | | | |

Aspherical coefficient

4th surface

R = 5.676
K = 0.000
$A_4 = -5.30650e-04$    $A_6 = -1.94598e-05$
$A_8 = 4.18498e-07$    $A_{10} = -2.70943e-08$

8th surface

R = 5.515
K = -0.057
$A_4 = -4.57613e-04$    $A_6 = -2.98302e-06$
$A_8 = -1.04928e-06$

9th surface

R = -104.444
K = -246.372
$A_4 = -2.44514e-05$    $A_6 = 1.42024e-05$
$A_8 = -2.23737e-06$    $A_{10} = 6.04441e-08$

13th surface

R = -4.071
K = -6.840
$A_4 = -2.07073e-02$    $A_6 = 1.75500e-03$
$A_8 = -2.53861e-04$    $A_{10} = 2.15310e-05$

14th surface

R = -19.326
K = 7.392
$A_4 = -4.71194e-03$    $A_6 = 4.74756e-04$
$A_8 = -2.94259e-05$    $A_{10} = 1.92302e-06$

Zoom Data ($\infty$)

| | WE | ST | TE |
|---|---|---|---|
| f(mm) | 6.77 | 14.94 | 32.91 |
| $F_{NO}$ | 2.80 | 4.05 | 6.11 |
| $2\omega(°)$ | 61.42 | 28.04 | 13.00 |
| $d_2$ | 1.00 | 4.21 | 8.28 |
| $d_6$ | 14.22 | 5.51 | 0.70 |
| $d_{12}$ | 4.38 | 4.45 | 4.50 |
| $d_{14}$ | 2.04 | 5.97 | 12.44 |

EXAMPLE 3

| | | | |
|---|---|---|---|
| $r_1 = 18.872$ | $d_1 = 0.86$ | $n_{d1} = 1.84666$ | $v_{d1} = 23.78$ |
| $r_2 = 14.903$ | $d_2 = 2.46$ | $n_{d2} = 1.49700$ | $v_{d2} = 81.54$ |
| $r_3 = -178.548$ | $d_3 = $ (variable) | | |
| $r_4 = -18.365$ | $d_4 = 1.00$ | $n_{d3} = 1.80610$ | $v_{d3} = 40.92$ |
| $r_5 = 5.839*$ | $d_5 = 1.71$ | | |
| $r_6 = 11.404$ | $d_6 = 1.50$ | $n_{d4} = 1.92286$ | $v_{d4} = 20.88$ |
| $r_7 = 40.773$ | $d_7 = $ (variable) | | |
| $r_8 = \infty$(S) | $d_8 = 0.00$ | | |
| $r_9 = 5.455*$ | $d_9 = 2.60$ | $n_{d5} = 1.49700$ | $v_{d5} = 81.54$ |
| $r_{10} = -379.928*$ | $d_{10} = 0.10$ | | |
| $r_{11} = 5.299$ | $d_{11} = 0.50$ | $n_{d6} = 2.00069$ | $v_{d6} = 25.46$ |
| $r_{12} = 3.532$ | $d_{12} = 2.20$ | $n_{d7} = 1.56384$ | $v_{d7} = 60.67$ |
| $r_{13} = 13.169$ | $d_{13} = $ (variable) | | |
| $r_{14} = -6.157*$ | $d_{14} = 1.00$ | $n_{d8} = 1.62238$ | $v_{d8} = 59.93$ |
| $r_{15} = -57.851*$ | $d_{15} = $ (variable) | | |
| $r_{16} = \infty$ | $d_{16} = 0.86$ | $n_{d9} = 1.53996$ | $v_{d9} = 59.45$ |
| $r_{17} = \infty$ | $d_{17} = 0.27$ | | |
| $r_{18} = \infty$ | $d_{18} = 0.50$ | $n_{d10} = 1.51633$ | $v_{d10} = 64.14$ |
| $r_{19} = \infty$ | $d_{19} = 0.60$ | | |
| $r_{20} = \infty$(I) | | | |

Aspherical coefficient

5th surface

R = 5.839
K = 0.000
$A_4 = -5.77659e-04$    $A_6 = -1.40172e-05$
$A_8 = 4.32513e-08$    $A_{10} = -1.48730e-08$

9th surface

R = 5.455
K = -0.041

-continued $A_4 = -4.30102e-04$    $A_6 = -4.52676e-06$
$A_8 = -1.24567e-06$

10th surface $R = -379.928$
$K = -33429.284$
$A_4 = -3.36864e-06$    $A_6 = 9.92967e-06$
$A_8 = -2.26508e-06$    $A_{10} = 5.65164e-08$ 14th surface $R = -6.157$
$K = -19.271$
$A_4 = -1.96367e-02$    $A_6 = 1.63220e-03$
$A_8 = -2.16157e-04$    $A_{10} = 1.55737e-05$ 15th surface $R = -57.851$
$K = 160.263$
$A_4 = -6.02585e-03$    $A_6 = 4.51098e-04$
$A_8 = -1.49008e-05$    $A_{10} = 5.22561e-07$ Zoom Data (∞)

|          | WE    | ST    | TE    |
|----------|-------|-------|-------|
| f(mm)    | 6.78  | 14.94 | 32.88 |
| $F_{NO}$ | 2.80  | 3.70  | 5.29  |
| 2ω(°)    | 63.82 | 27.61 | 12.85 |
| $d_3$    | 1.09  | 7.76  | 12.53 |
| $d_7$    | 12.84 | 5.62  | 0.70  |
| $d_{13}$ | 3.98  | 4.03  | 4.09  |
| $d_{15}$ | 1.98  | 4.71  | 9.53  |

Figure 4A:
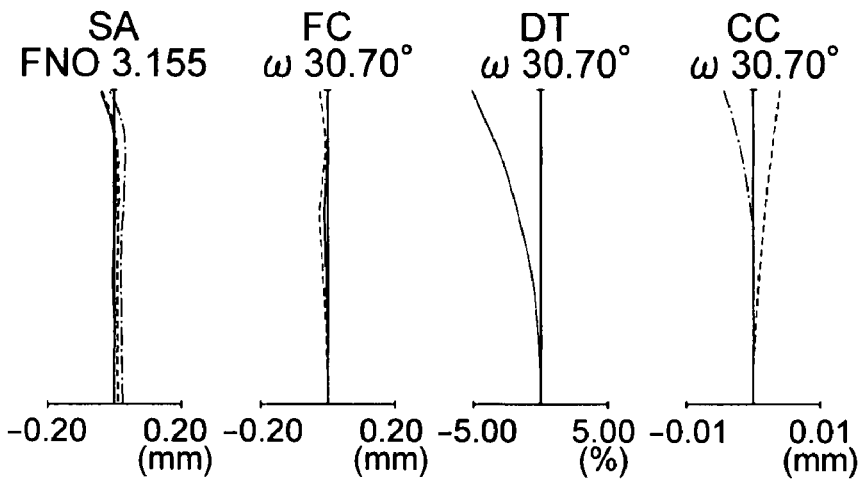
FIGS. 4A to 4C are aberration diagrams of Example 1 when focused on the infinitely far object.
Figure 4B:
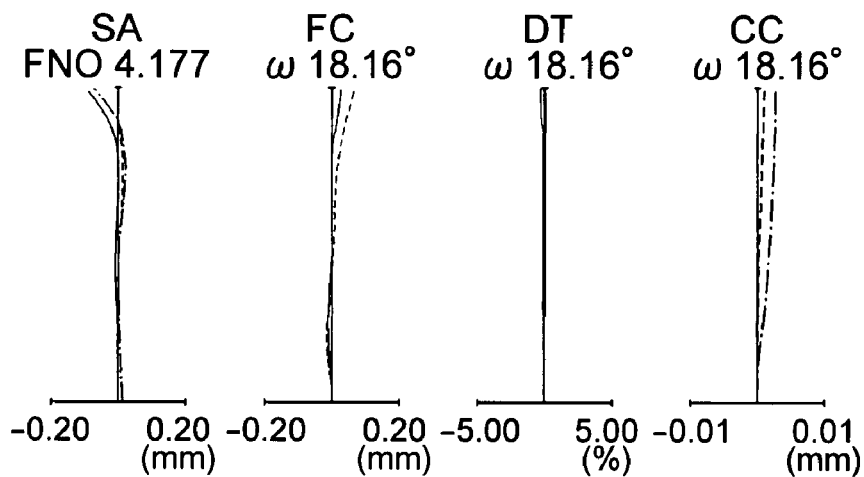
Figure 4C:
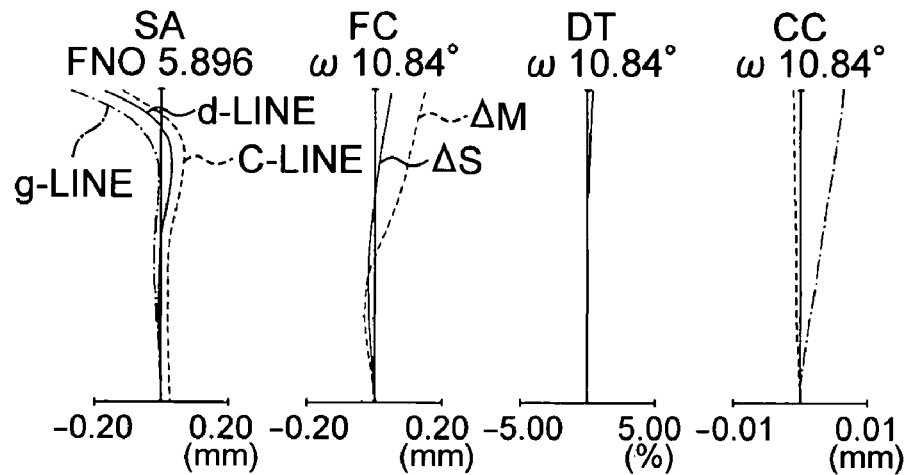
Figure 5A:
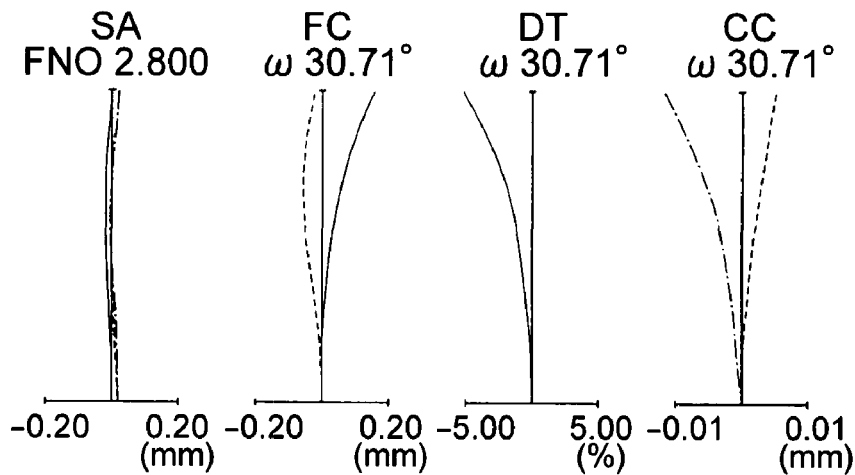
FIGS. 5A to 5C are aberration diagrams of Example 2 when focused on the infinitely far object.
Figure 5B:
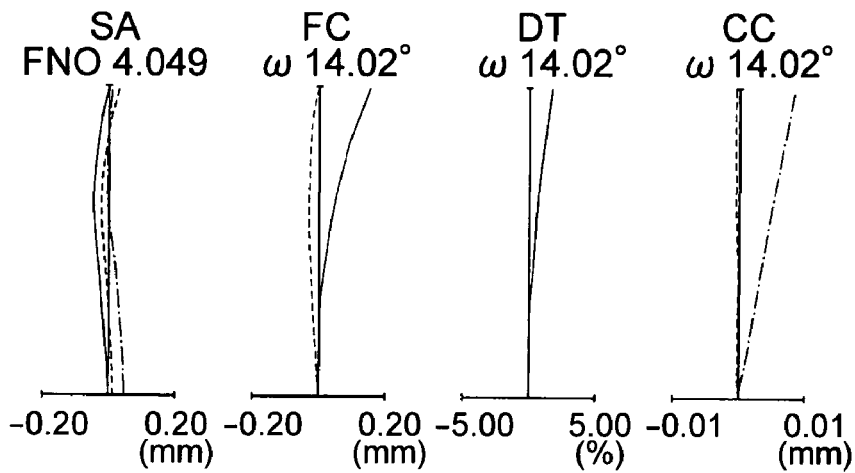
Figure 5C:
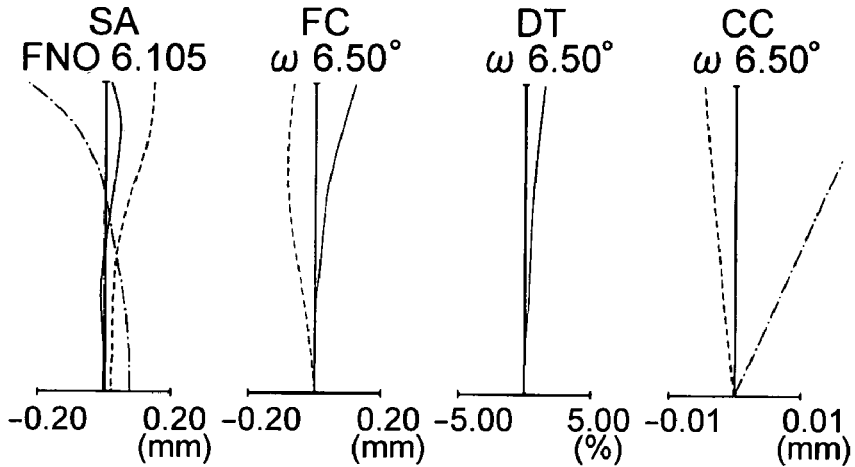
Figure 6A:
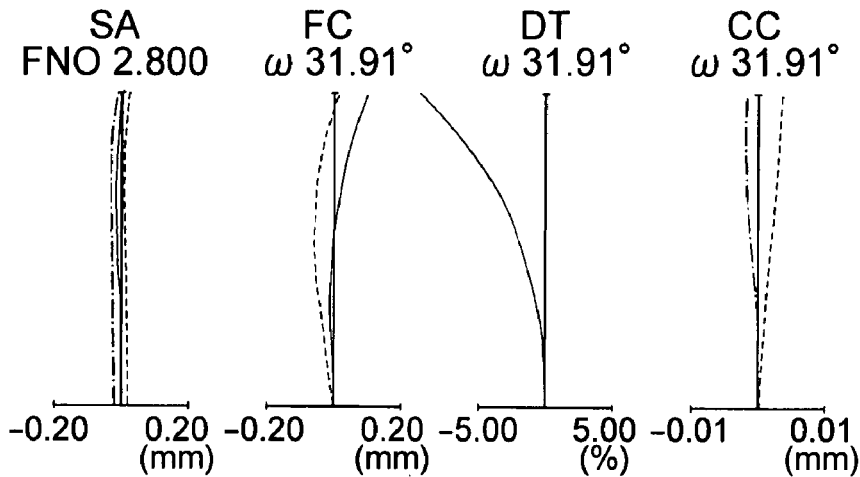
FIGS. 6A to 6C are aberration diagrams of Example 3 when focused on the infinitely far object.
Figure 6B:
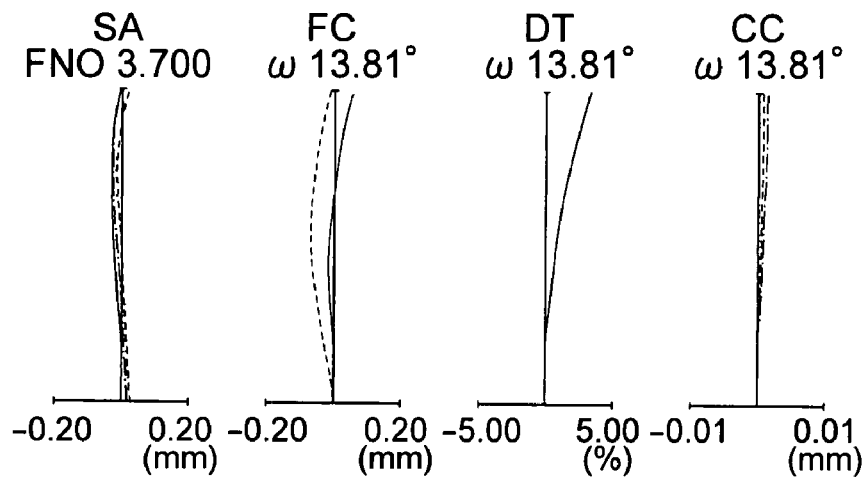
Figure 6C:
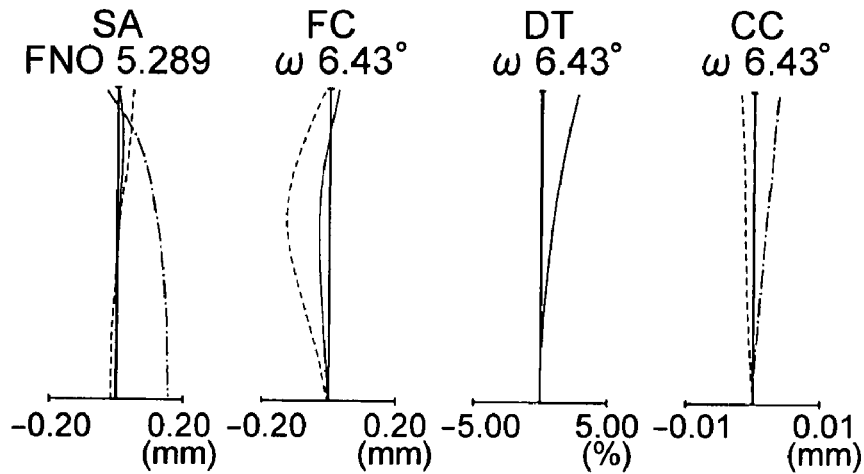

Aberration diagrams of Examples 1 to 3 when focused on the infinite object as described above are shown in FIGS. 4A to 6C. In these drawings, FIGS. 4A, 5A and 6A show aberrations in a wide-angle end, FIGS. 4B, 5B and 6B show aberrations in an intermediate state and FIGS. 4C, 5C and 6C show aberrations in a telephoto end. In the drawings, SA is a spherical aberration, FC is an astigmatism, DT is a distortion, and CC is a chromatic aberration of magnification. In the drawings, "ω" is a half angle of view.

Next, values of the conditions (1) to (13) in the examples, and values of $f_1$, $f_3$ will be described.

| Condition formula | Example 1 | Example 2 | Example 3 |
|-------------------|-----------|-----------|-----------|
| (1)               | -0.673    | -1.534    | -1.238    |
| (2)               | -0.109    | -1.050    | —         |
| (3)               | 81.54     | 81.54     | —         |
| (4), (7)          | 0.214     | 0.609     | 1.032     |
| (5), (8)          | 0.059     | 0.535     | 0.942     |
| (6)               | —         | —         | -0.809    |
| (9), (10)         | 1.22      | 1.24      | 1.13      |
| (11)              | 10.56     | 5.26      | 6.01      |
| (12)              | 1.14      | 1.55      | 1.13      |
| (13)              | 1.92286   | 1.92286   | 1.92286   |
| (14)              | 1.88300   | 1.80610   | 1.80610   |
| $f_1$             | 71.47     | 35.66     | 40.79     |
| $f_3$             | 8.25      | 8.40      | 7.67      |

The above examples are all directed to a four-unit zoom lens system. The zoom lens system according to the present invention may be constituted to include additional lens units and include lens units exceeding four lens units in total. However, the constitution of the four-unit zoom lens system is preferable in view of miniaturization of a lens system.

The zoom lens system according to the present invention can be used as a photographing lens of an image pickup apparatus. In this case, it is preferable that the image pickup apparatus includes the zoom lens system according to the present invention; and an electronic image sensor which is disposed on an image side of the zoom lens system and which converts an image formed by the zoom lens system into an electric signal.

Figure 7:
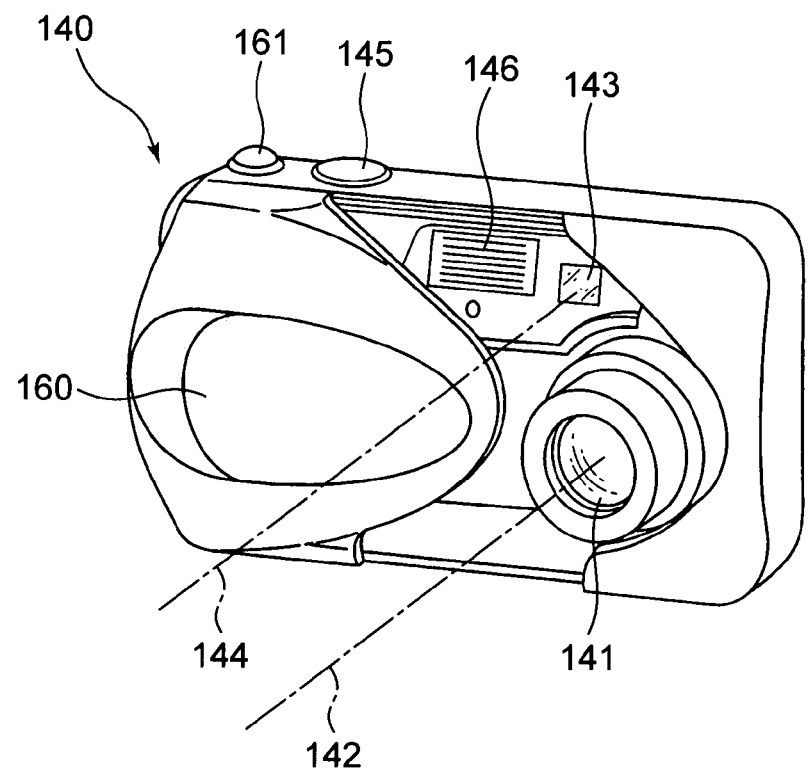
FIG. 7 is a front perspective view showing an appearance of a digital camera in which the zoom lens system according to the present invention is used.
Figure 8:
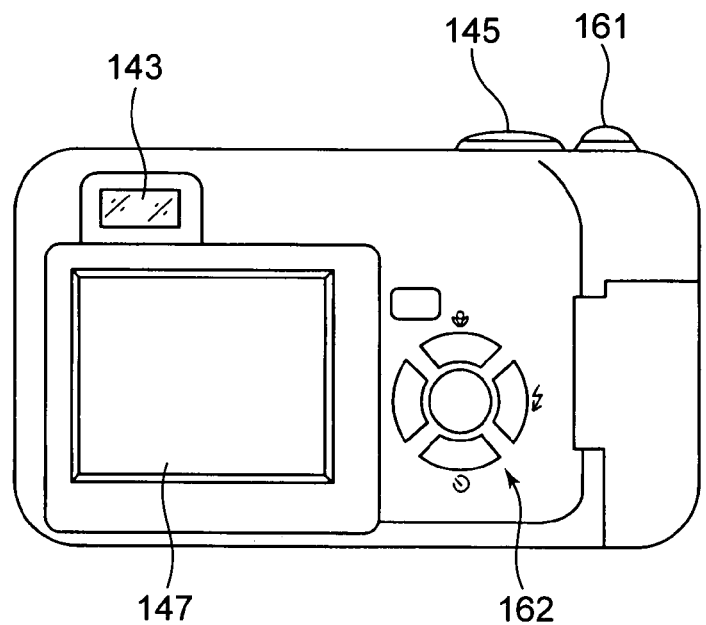
FIG. 8 is a rear view of the digital camera of FIG. 7.
Figure 9:
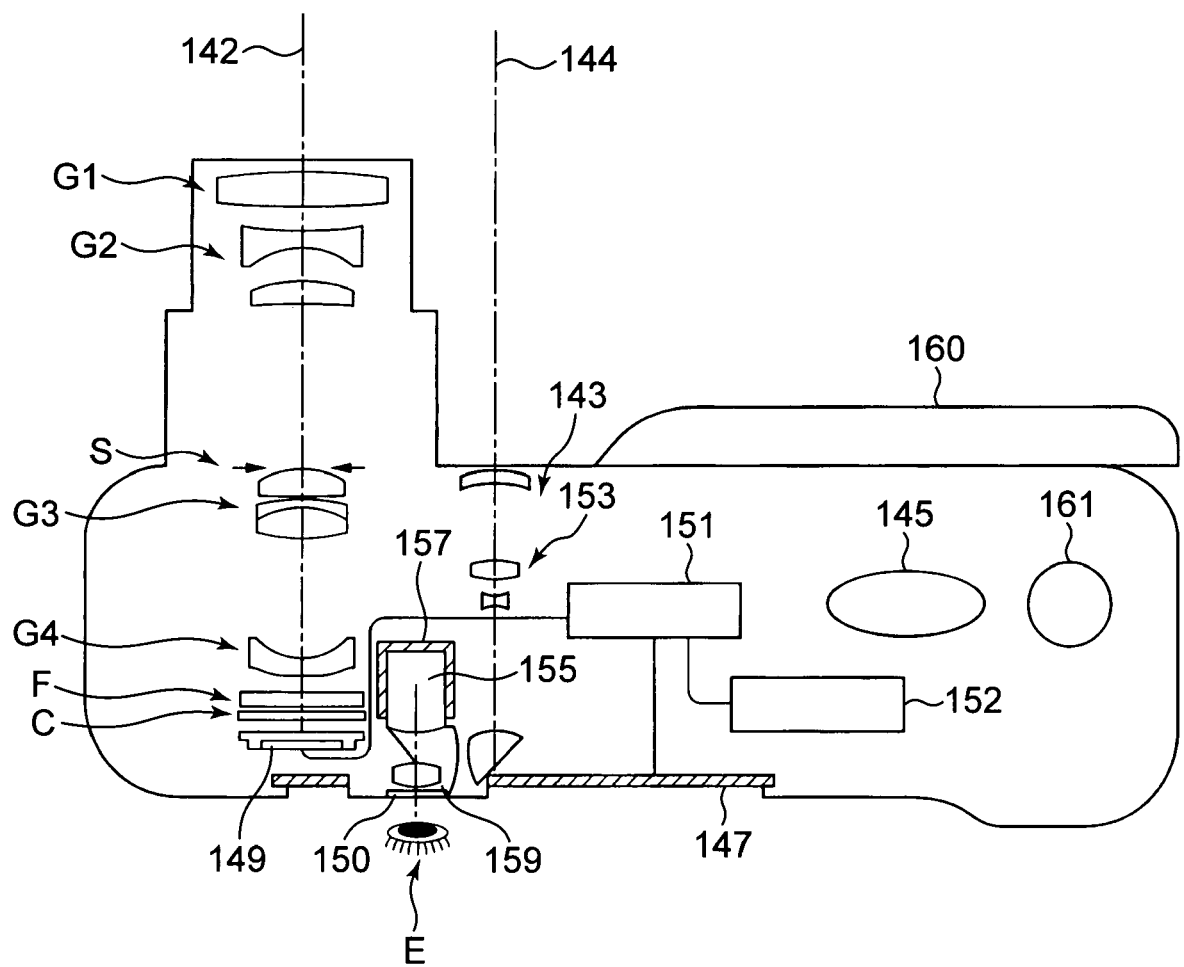
FIG. 9 is a schematic sectional view showing a constitution of the digital camera of FIG. 7.

FIGS. 7 to 9 are conceptual diagrams showing a constitution of a digital camera as an example of the image pickup apparatus in which the zoom lens system according to the present invention is incorporated as a photographing optical system. FIG. 7 is a front perspective view showing an appearance of a digital camera; FIG. 8 is a rear view; and FIG. 9 is a schematic sectional view showing a constitution of the digital camera. In addition, in FIGS. 7 and 9, a non-collapsible state of the photographing optical system is shown. The digital camera 140 includes the photographing optical system 141 having a photographing optical path 142; a finder optical system 143 having an optical path 144 for a finder; a shutter button 145; a flash lamp 146; a liquid crystal display monitor 147; a focal length change button 161; a setting change switch 162 and the like. In a case where the photographing optical system 141 is collapsed, when a cover 160 is slid, the photographing optical system 141, the finder optical system 143 and the flash lamp 146 are covered with the cover 160. Moreover, when the cover 160 is opened to bring the camera 140 into a photographing state, the photographing optical system 141 is brought into the non-collapsed state shown in FIG. 9. When the shutter button 145 disposed at an upper portion of the camera 140 is pressed, the photographing is performed through the photographing optical system 141 in response to the pressed button. Any zoom lens system according to the present invention is usable as the photographing optical system. In this drawing, Example 1 (FIG. 1A) is used. An object image is formed by the photographing optical system 141 on an image pickup surface of a CCD 149 via a low pass filter F and a cover glass C provided with a wavelength band restrictive coating. This object image received by the CCD 149 is displayed as an electronic image in the liquid crystal display monitor 147 disposed in a rear surface of the camera via processing means 151. The processing means 151 is connected to recording means 152, and the photographed electronic image can be recorded. It is to be noted that the recording means 152 may be integrated with the processing means 151, or the means may separately be arranged. As a recording medium in which the electronic image is recorded, a hard disk drive (HDD), a memory card, an optical disk such as a DVD or the like is usable. Instead of the CCD 149, a silver halide camera may be constituted in which a silver halide film is used.

The objective optical system 153 for the finder is disposed along the optical path 144 for the finder. The objective optical system 153 for the finder is constituted of a zoom optical system including a plurality of lens units (three lens units in the drawing) and two prisms. In the system, a focal length changes in conjunction with the zoom lens system of the photographing optical system 141. The object image is formed on a view field frame 157 of an erecting prism 155, which is an image erecting member, by the objective optical system 153 for the finder. Behind the erecting prism 155, an eyepiece optical system 159 is disposed which guides an erected image into an observer's eyeball E. It is to be noted that a cover member 150 is disposed on an emission side of the eyepiece optical system 159.

According to the present invention, in the digital camera 140 constituted in this manner, the photographing optical system 141 is remarkably thin when collapsed, and has a high zoom ratio and a remarkably stable image forming performance in the whole magnification range. Therefore, a high performance, miniaturization and a wide angle can be realized.

According to the present invention, a lens arrangement of the zoom lens system can be simplified. When the zoom lens system is collapsed and stored, the zoom lens system advantageous for a compact constitution when collapsed can be provided.

Moreover, according to the present invention, the zoom lens system can be provided in which, even if an angle of field in the wide-angle end is enlarged, the outer diameter of the first lens unit is easily reduced. In addition, the zoom lens system can be provided which is advantageous in establishing both of the aberration correction and the compact constitution when collapsed.

It is to be noted that the zoom lens system satisfying any of the above constitutions and conditions and any of the following constitutions at the same time is included in the scope of the present invention.

(Constitution 1)

A zoom lens system comprising, in order from an object side:
　a first lens unit having a positive refractive power;
　a second lens unit having a negative refractive power;
　a third lens unit having a positive refractive power; and
　a fourth lens unit having a negative refractive power,
　wherein during zooming from a wide-angle end to a telephoto end, a space between the lens units changes;
　the first lens unit includes one positive lens;
　the second lens unit includes two lenses having a negative lens and a positive lens in order from the object side; and
　the fourth lens unit includes one negative lens.

(Constitution 2)

A zoom lens system comprising, in order from an object side:
　a first lens unit having a positive refractive power;
　a second lens unit having a negative refractive power;
　a third lens unit having a positive refractive power; and
　a fourth lens unit having a negative refractive power,
　wherein during zooming from a wide-angle end to a telephoto end, a space between the lens units changes;
　the first lens unit includes two lenses having a negative lens and a positive lens in order from the object side;
　the second lens unit includes two lenses having a negative lens and a positive lens in order from the object side; and
　the fourth lens unit includes one negative lens.

(Constitution 3)

A zoom lens system comprising, in order from an object side:
　a first lens unit having a positive refractive power;
　a second lens unit having a negative refractive power;
　a third lens unit having a positive refractive power; and
　a fourth lens unit having a negative refractive power,
　wherein during zooming from a wide-angle end to a telephoto end, a space between the lens units changes;
　the first lens unit includes one positive lens;
　the second lens unit includes two lenses having a negative lens and a positive lens in order from the object side;
　the third lens unit includes three lenses having a positive lens, a negative lens and a positive lens in order from the object side; and
　the fourth lens unit includes one negative lens.

(Constitution 4)

A zoom lens system comprising, in order from an object side:
　a first lens unit having a positive refractive power;
　a second lens unit having a negative refractive power;
　a third lens unit having a positive refractive power; and
　a fourth lens unit having a negative refractive power,
　wherein during zooming from a wide-angle end to a telephoto end, a space between the lens units changes;
　the first lens unit includes two lenses having a negative lens and a positive lens in order from the object side;
　the second lens unit includes two lenses having a negative lens and a positive lens in order from the object side;
　the third lens unit includes three lenses having a positive lens, a negative lens and a positive lens in order from the object side; and
　the fourth lens unit includes one negative lens.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens system comprising, in order from an object side:
　a first lens unit having a positive refractive power;
　a second lens unit having a negative refractive power;
　a third lens unit having a positive refractive power; and
　a fourth lens unit having a negative refractive power,
　wherein during zooming from a wide-angle end to a telephoto end,
　a space between the first lens unit and the second lens unit enlarges,
　a space between the second lens unit and the third lens unit narrows,
　a space between the third lens unit and the fourth lens unit changes, and
　all of the first to fourth lens units move along an optical axis,
　the zoom lens system further comprising an aperture stop which moves integrally with the third lens unit during the zooming,
　the fourth lens unit comprising a negative lens element, the total number of the lens elements of the fourth lens unit being one,
　the zoom lens system being a four-unit zoom lens system.

2. The zoom lens system according to claim 1, wherein the negative lens element of the fourth lens unit has refractive surfaces on the object side and an image side, which are inclined toward the object side in an area thereof distant from the optical axis; and
　the following condition is satisfied:

$$-2.0 < (RL_{41F} + RL_{41R})/(RL_{41F} - RL_{41R}) < -0.1 \quad (1),$$

in which $RL_{41F}$ is a paraxial radius of curvature of the object-side surface of the negative lens element of the fourth lens unit, and $RL_{41R}$ is a paraxial radius of curvature of the image-side surface of the negative lens element of the fourth lens unit.

3. The zoom lens system according to claim 1, wherein both of an object-side surface and an image-side surface of the fourth lens unit are aspherical surfaces.

4. The zoom lens system according to claim 1, wherein the first lens unit comprises a positive lens element; and
　the total number of the lens elements of the first lens unit is one.

5. The zoom lens system according to claim 1, wherein the first lens unit comprises only one cemented lens component having a negative lens element and a positive lens element in order from the object side.

6. The zoom lens system according to claim 5, wherein the following condition is satisfied:

$$-1.5 < (RL_{ceF} + RL_{ceR})/(RL_{ceF} - RL_{ceR}) < 0 \quad (6),$$

in which $RL_{ceF}$ is a paraxial radius of curvature of the object-side surface of the cemented lens component of the first lens unit, and $RL_{ceR}$ is a paraxial radius of curvature of the image-side surface of the cemented lens component of the first lens unit.

7. The zoom lens system according to claim 5, wherein the following condition is satisfied:

$$0.75 < D_{12T}/(D_{23W} - D_{23T}) < 1.30 \quad (7),$$

in which $D_{12T}$ is an axial space between the first lens unit and the second lens unit in the telephoto end, $D_{23W}$ is an axial space between the second lens unit and the third lens unit in the wide-angle end, and $D_{23T}$ is an axial space between the second lens unit and the third lens unit in the telephoto end.

8. The zoom lens system according to claim 7, wherein the following condition is satisfied:

$$0.70 < (D_{12T} - D_{12W})/(D_{23W} - D_{23T}) < 1.10 \quad (8),$$

in which $D_{12W}$ is an axial space between the first lens unit and the second lens unit in the wide-angle end, $D_{12T}$ is an axial space between the first lens unit and the second lens unit in the telephoto end, $D_{23W}$ is an axial space between the second lens unit and the third lens unit in the wide-angle end, and $D_{23T}$ is an axial space between the second lens unit and the third lens unit in the telephoto end.

9. The zoom lens system according to claim 1, wherein the third lens unit satisfies the following condition:

$$0.8 < f_3/f_W < 3 \quad (9),$$

in which $f_3$ is a focal length of the third lens unit, and $f_W$ is a focal length of the zoom lens system in the wide-angle end.

10. The zoom lens system according to claim 1, wherein the first lens unit satisfies the following condition:

$$3 < f_1/f_W < 20 \quad (11),$$

in which $f_1$ is a focal length of the first lens unit, and $f_W$ is a focal length of the zoom lens system in the wide-angle end.

11. The zoom lens system according to claim 1, wherein the third lens unit is disposed closer to the object side in the telephoto end than in the wide-angle end; and the following condition is satisfied:

$$0.5 < X_3/f_W < 2.0 \quad (12),$$

in which $X_3$ is a displacement amount of the third lens unit during the zooming from the wide-angle end to the telephoto end, and fw is a focal length of the zoom lens system in the wide-angle end.

12. The zoom lens system according to claim 1, wherein the second lens unit comprises a negative lens element and a positive lens element in order from the object side; the total number of the lens elements of the second lens unit is two; and the following conditions are satisfied:

$$1.85 < N_{2P} \quad (13); \text{ and}$$

$$1.74 < N_{2N} \quad (14),$$

in which $N_{2P}$ is a refractive index of the positive lens element of the second lens unit for a d-line, and $N_{2N}$ is a refractive index of the negative lens element of the second lens unit for a d-line.

13. The zoom lens system according to claim 1, wherein the first lens unit comprises a negative lens element and a positive lens element, the total number of the lens elements of the first lens unit is two;
the second lens unit comprises, in order from the object side, a negative lens element and a positive lens element, the total number of the lens elements of the second lens unit is two;
the fourth lens unit comprises a negative lens element, and the total number of the lens elements of the fourth lens unit is one.

14. The zoom lens system according to claim 1, wherein the third lens unit comprises, in order from the object side, a positive lens element, a negative lens element and a positive lens element; and
the total number of the lens elements of the third lens unit is three.

15. The zoom lens system according to claim 1, wherein the aperture stop is disposed right before the third lens unit on the object side.

16. An image pickup apparatus comprising:
the zoom lens system according to claim 1; and
an electronic image sensor which is disposed on an image side of the zoom lens system and which converts an image formed by the zoom lens system into an electric signal.

17. A zoom lens system comprising, in order from an object side:
a first lens unit having a positive refractive power;
a second lens unit having a negative refractive power;
a third lens unit having a positive refractive power; and
a fourth lens unit having a negative refractive power,
wherein during zooming from a wide-angle end to a telephoto end,
a space between the first lens unit and the second lens unit enlarges,
a space between the second lens unit and the third lens unit narrows,
a space between the third lens unit and the fourth lens unit changes, and
all of the first to fourth lens units move along an optical axis,
the zoom lens system further comprising an aperture stop which moves integrally with the third lens unit during the zooming,
the first lens unit comprising a positive lens element, the total number of the lens elements of the first lens unit being one,
the zoom lens system being a four-unit zoom lens system.

18. The zoom lens system according to claim 17, wherein the following condition is satisfied:

$$-1.5 < (RL_{11F} + RL_{11R})/(RL_{11F} - RL_{11R}) < 0 \quad (2),$$

in which $RL_{11F}$ is a paraxial radius of curvature of the object-side surface of the positive lens element of the first lens unit, and $RL_{11R}$ is a paraxial radius of curvature of the image-side surface of the positive lens element of the first lens unit.

19. The zoom lens system according to claim 17, wherein the following condition is satisfied:

$$62.0 < \nu_{L11} < 95.0 \quad (3),$$

in which $\nu_{L11}$ is the Abbe number of the positive lens element of the first lens unit.

20. The zoom lens system according to claim 17, wherein the following condition is satisfied:

$$0.15 < D_{12T}/(D_{23W} - D_{23T}) < 0.70 \quad (4),$$

in which $D_{12T}$ is an axial space between the first lens unit and the second lens unit in the telephoto end, $D_{23W}$ is an axial space between the second lens unit and the third lens unit in the wide-angle end, and $D_{23T}$ is an axial space between the second lens unit and the third lens unit in the telephoto end.

21. The zoom lens system according to claim 20, wherein the following condition is satisfied:

$$0.03 < (D_{12T} - D_{12W})/(D_{23W} - D_{23T}) < 0.60 \quad (5),$$

in which $D_{12W}$ is an axial space between the first lens unit and the second lens unit in the wide-angle end, $D_{12T}$ is an axial space between the first lens unit and the second lens unit in the telephoto end, $D_{23W}$ is an axial space between the second lens unit and the third lens unit in the wide-angle end, and $D_{23T}$ is an axial space between the second lens unit and the third lens unit in the telephoto end.

22. The zoom lens system according to claim 17, wherein the first lens unit comprises a positive lens element, the total number of the lens elements of the first lens unit is one;
the second lens unit comprises, in order from the object side, a negative lens element and a positive lens element, the total number of the lens elements of the second lens unit is two;
the fourth lens unit comprises a negative lens element, and the total number of the lens elements of the fourth lens unit is one.

23. A zoom lens system comprising, in order from an object side:
a first lens unit having a positive refractive power;
a second lens unit having a negative refractive power;
a third lens unit having a positive refractive power; and
a fourth lens unit having a negative refractive power,
wherein during zooming from a wide-angle end to a telephoto end,
a space between the first lens unit and the second lens unit enlarges,
a space between the second lens unit and the third lens unit narrows,
a space between the third lens unit and the fourth lens unit changes, and
all of the first to fourth lens units move along an optical axis,
the zoom lens system further comprising an aperture stop which moves integrally with the third lens unit during the zooming,
the zoom lens system being a four-unit zoom lens system, the third lens unit being configured to satisfy the following condition:

$$1 < f_3/f_W < 2 \quad (10),$$

in which $f_3$ is a focal length of the third lens unit, and $f_W$ is a focal length of the zoom lens system in the wide-angle end.

24. A zoom lens system comprising, in order from an object side:
a first lens unit having a positive refractive power;
a second lens unit having a negative refractive power;
a third lens unit having a positive refractive power; and
a fourth lens unit having a negative refractive power,
wherein during zooming from a wide-angle end to a telephoto end,
a space between the first lens unit and the second lens unit enlarges,
a space between the second lens unit and the third lens unit narrows,
a space between the third lens unit and the fourth lens unit changes, and
all of the first to fourth lens units move along an optical axis,
the zoom lens system further comprising an aperture stop which moves integrally with the third lens unit during the zooming,
the second lens unit comprising a negative lens element and a positive lens element in order from the object side, the total number of the lens elements of the second lens unit being two,
the zoom lens system being a four-unit zoom lens system, the following condition being satisfied:

$$1.85 < N_{2P} \quad (13); \text{ and}$$

$$1.74 < N_{2N} \quad (14),$$

in which $N_{2P}$ is a refractive index of the positive lens element of the second lens unit for a d-line, and $N_{2N}$ is a refractive index of the negative lens element of the second lens unit for a d-line.

* * * * *